United States Patent [19]
Kazama et al.

[11] Patent Number: 5,589,748
[45] Date of Patent: Dec. 31, 1996

[54] POSITION CONTROL SYSTEM AND POSITION CONTROL METHOD THEREOF

[75] Inventors: Tsutomu Kazama; Mitsuyasu Kachi, both of Nagoya, Japan

[73] Assignee: Mitsubishi Denki Kabushiki Kaisha, Tokyo, Japan

[21] Appl. No.: 208,480

[22] Filed: Mar. 10, 1994

[30] Foreign Application Priority Data

Mar. 10, 1993 [JP] Japan ................... 5-049473

[51] Int. Cl.$^6$ .................................................. G06F 15/46
[52] U.S. Cl. ................ 318/560; 318/616; 318/568.22; 364/474.3
[58] Field of Search ................ 318/568.18, 609, 318/610, 615, 616, 568.22; 364/474.3

[56] References Cited

U.S. PATENT DOCUMENTS

| | | | |
|---|---|---|---|
| 4,331,910 | 5/1982 | Kohzai et al. | 318/618 |
| 4,864,204 | 9/1989 | Daggett et al. | 318/568.18 |
| 4,887,015 | 12/1989 | Kurakake et al. | 318/609 |
| 4,916,375 | 4/1990 | Kurakake et al. | . |
| 5,055,760 | 10/1991 | Nashiki et al. | 318/687 |
| 5,105,135 | 4/1992 | Nashiki et al. | 318/568.11 |
| 5,107,193 | 4/1992 | Iwashita | 318/560 |
| 5,134,354 | 7/1992 | Yamamoto et al. | 318/610 |
| 5,184,055 | 2/1993 | Ohishi et al. | 318/615 |
| 5,204,602 | 4/1993 | Iwashita | 318/630 |
| 5,260,629 | 11/1993 | Ioi et al. | 318/568.19 |

FOREIGN PATENT DOCUMENTS

| | | |
|---|---|---|
| 0034229 | 8/1981 | European Pat. Off. . |
| 0092378 | 4/1983 | European Pat. Off. . |
| 0450084 | 10/1991 | European Pat. Off. . |
| 60-209812 | 10/1985 | Japan . |
| 1433213 | 4/1976 | United Kingdom . |
| 1587288 | 4/1981 | United Kingdom . |

*Primary Examiner*—Brian Sircus
*Attorney, Agent, or Firm*—Sughrue, Mion, Zinn, Macpeak & Seas

[57] ABSTRACT

A position control system for feeding back position information detected by position detection means for detecting the position of a machine movable part, is disclosed. The system includes a second order system position control loop formed by providing an internal second control loop. By adequately setting the internal control loop gain, a high response and stable control loop and also smooth response waveform can be obtained, thus ensuring vibration-free operation of the machine.

11 Claims, 18 Drawing Sheets

F I G. 1
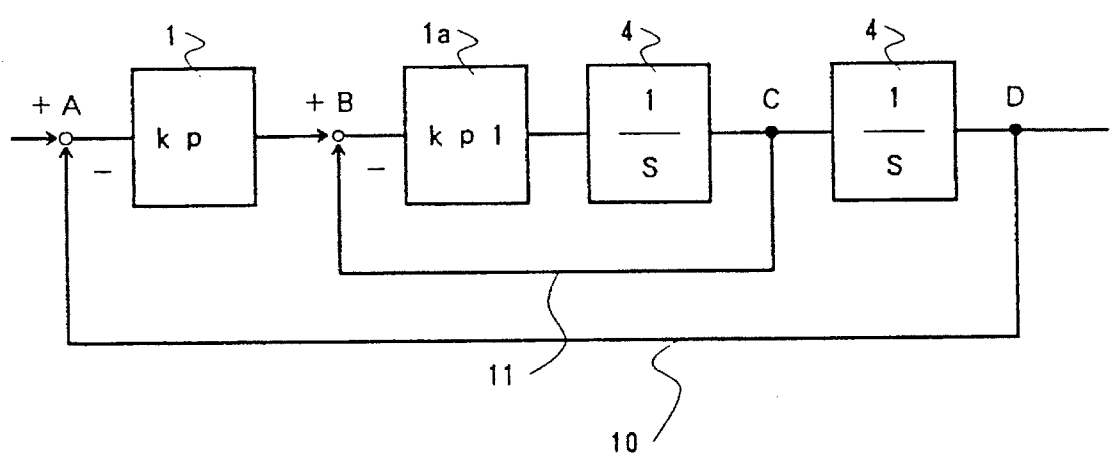

F I G. 1 2 A
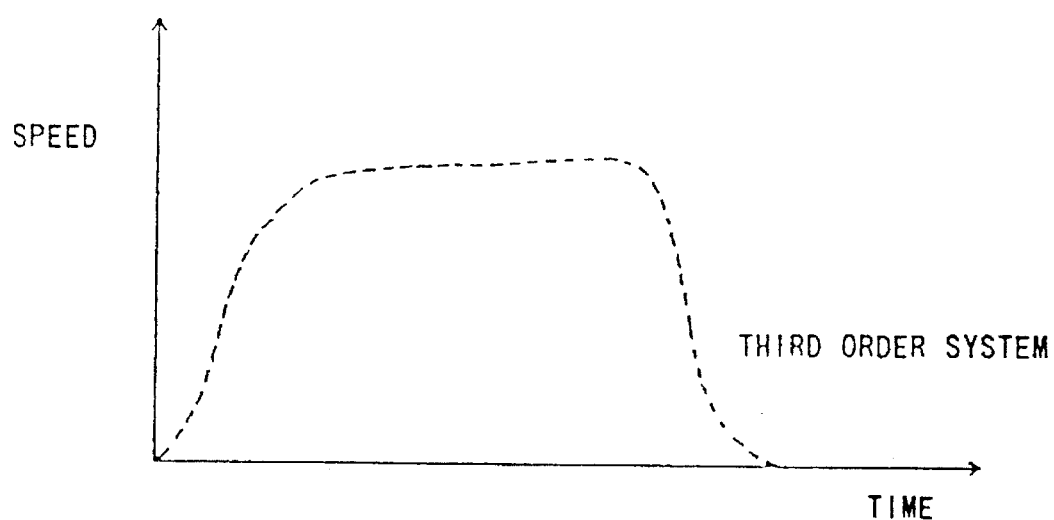
F I G. 1 2 B
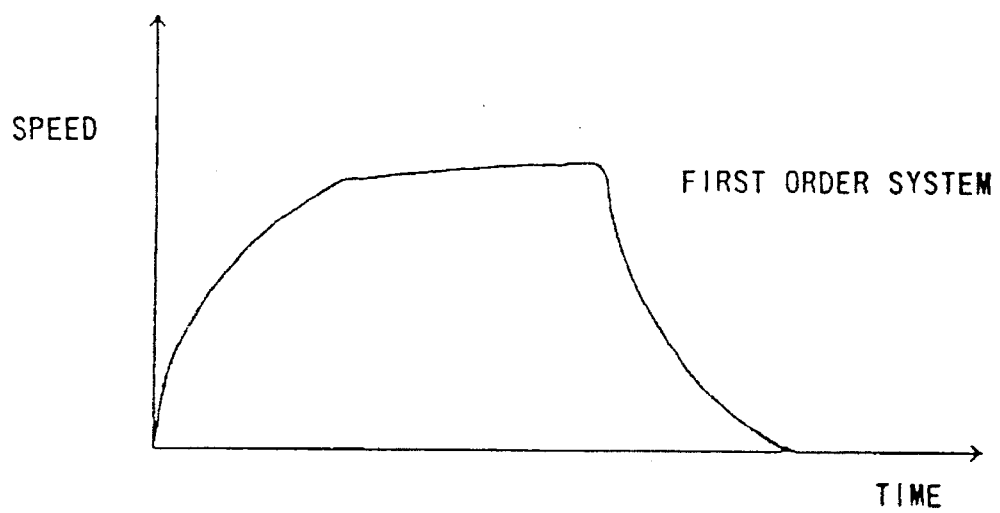

FIG. 14A
PRIOR ART
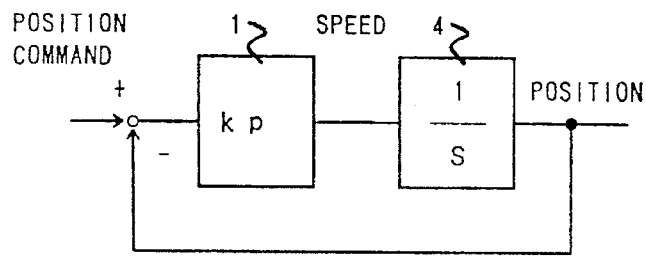
FIG. 14B(1)
PRIOR ART
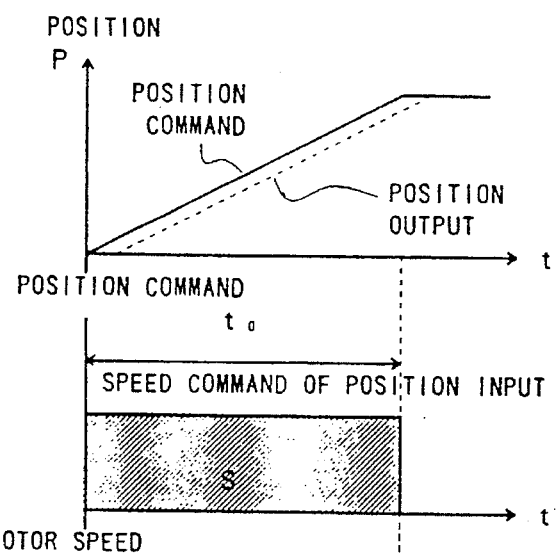
FIG. 14B(2)
PRIOR ART
FIG. 14B(3)
PRIOR ART
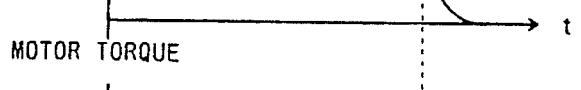
FIG. 14B(4)
PRIOR ART
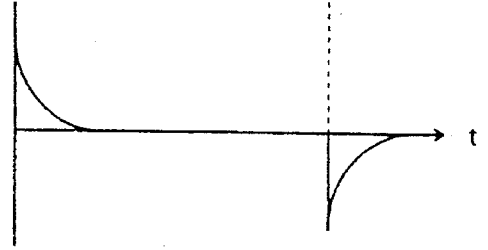

REAL CIRCLE CHARACTERISTIC

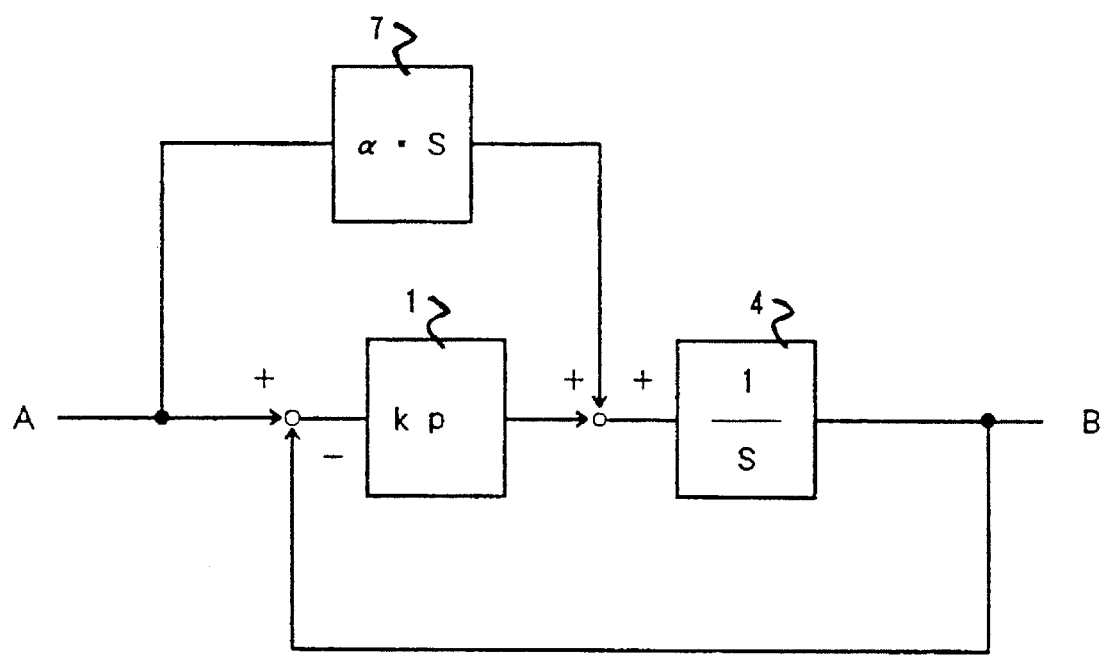
F I G. 1 6 PRIOR ART

POSITION CONTROL SYSTEM AND POSITION CONTROL METHOD THEREOF

FIELD OF THE INVENTION

This invention relates to position control systems and position control method thereof for various motor drives such as servo controllers, spindle controllers and position controller of numerical control machines.

BACKGROUND OF THE INVENTION

FIG. 13 is a block diagram showing the flow of a servo system control signal in a conventional position control system by using transfer functions. Referring to the Figure, designated at 1 is a position loop gain operational unit having a gain Kp, at 2 a speed loop proportional integral compensation unit, at 3 an inertia unit, and at 4 an integrator. In FIG. 13, a position feedback signal is subtracted from a position command at point A, and the difference is amplified in the position loop gain operational unit 1, which has a transfer function kp and outputs a speed command. From the speed command, a speed feedback signal is subtracted at point B, and the difference is amplified in the speed loop proportional integral compensation unit 2, which has a transfer function Kv+Ki/S and outputs a torque command. The torque command represents the motor speed corresponding to the inertia component, less a reduction corresponding to a load torque, as seen at point C. The speed is negatively fed back from point D as the speed feedback signal as noted above. The position value, which is the time integral of the speed, is taken out at point E from the integrator 4, which has a transfer function 1/S and generates the position feedback signal.

When a machine is actually operated in the above system, the operation of the machine is equivalently approximated by the position loop response as shown in FIGS. 14A, 14B because the position loop response is sufficiently high compared to the speed loop response. The characteristic of the position loop shown in FIG. 14A is given as a transfer function G (S)

$$G(S) = \frac{1}{1 + \frac{1}{kp} S} \quad (1)$$

Next a description is made for FIG. 14B. When a positional command for moving to a specified position at a timing to (migration length S) is given, actual movement of a machine (motor) follows with a follow-up delay of the positional loop (by the positional loop time constant). A speed command for the position at this point of time is inputted as shown in the figure, and this area provides the specified position (time×speed). When the input as described above is provided, a rotation of the motor is executed with a time-lag of the first order, as shown in the figure. Also, the motor generates a steep torque when acceleration is started and when deceleration is started.

In the above position control system, the position loop has a first degree delay time constant and follows the command. Thus, with a real circle drawn with two axes (X and Y axes), as shown in FIG. 15, the orbit of the actual motor draws a circle on the inner side of the real circle in accordance with the first degree delay time constant. The radius reduction $\Delta R$ in this case is given as $$\Delta R = \frac{1}{2} \times \frac{F^2}{R} \times \left( \frac{1}{kp^2} \right) \quad (2)$$

Here, R is the radius of the circle, and F is the speed in the tangential direction. Conventionally, feed forward control as shown in FIG. 16 is used to compensate for the radius error $\Delta R$ which is generated due to the delay. By using this feed forward control, the radius reduction $\Delta R$ is compensated for to $$\Delta R = \frac{1}{2} \times \frac{F^2}{R} \times \frac{(1 - \alpha^2)}{kp^2} \quad (3)$$

By canceling the first degree delay having the first degree differential with the feed forward controller 7, and with the feed forward coefficient $\alpha$ set to 1, a motor orbit free from delay with respect to the command can be obtained.

Here, kp is a position loop gain, 1/kp is a time constant of the position loop, and S is a Laplace operator.

As other reference technical literature pertaining to the invention, there is "Acceleration and Deceleration Control System" disclosed in Japanese Patent Laid-Open No. 209812/85.

In the above feed forward control, however, the command is differentiated before being added. Therefore, command operation error is also differentiated, resulting in a waveform having many oscillating components. Consequently, by setting $\alpha=1$, machine vibrations are liable to be induced. Therefore, it is difficult to provide total compensation of for $\Delta R$ by using $\alpha$ above. Consequently, a smooth response waveform can not be obtained, resulting in vibrations of the machine.

Further, although the feed forward control is effective so far as the property of following commands, it has no suppression effect on external disturbances to the position feedback system. To enhance the suppression effect on external disturbances to the position feedback system, it is necessary to provide a high position loop gain kp. Doing so, however, leads to increased motor speed changes as in the torque waveform shown in FIG. 14B. Consequently, increased shocks are given to the machine, and also the tendency of picking up high frequency components (such as resonance of the machine system and noise) is increased. For the above reasons, stable gain increase can not be obtained.

FIGS. 17A and 17B show graphs for a comparison between the gain increase provided by a first order system and that provided by the high-order system according to the present invention. In gain increase with a conventional type of first order system, when a band required for control is raised, the system becomes like that shown with a dotted line in FIG. 17A. Also, a disturbance component becomes adapted to gain increase, so it comes to vibrate more easily. Namely, in a conventional type of first-order lag system, a band is attenuated by-20 dB. For this reason, when the gain is increased, a higher band width is required. However, the gain of the high frequency component also becomes higher, and the system is disadvantageously affected by a high-frequency noise more easily.

SUMMARY OF THE INVENTION

It is an object of a position control system and position control method thereof, in which the internal control loop gain is set to an adequate value in order to provide a high response, a stable control loop and a smooth response waveform, as well as to prevent vibrations of the machine.

According to the invention, there is provided a position control system for feeding back position information detected by position detection means for detecting the position of a machine movable part, the position control system including a second order system position control loop formed by providing an internal second control loop.

According to the invention, there is also provided a position control system for feeding back position information detected by position detection means for detecting the position of a machine movable part, the position control system including a third control loop formed by providing an internal second and an internal third control loop.

According to the invention, a second control loop or a second and a third control loop are provided in the position control loop. Thus, the degree of the position control loop is elevated, and the gains of the second and third control loops are set to minimum values free from overshoot with respect to the position loop gain.

As has been described in the foregoing, with the position control system according to the invention it is possible to obtain high response and stable position loop characteristic free from the influence of high frequency components. It is thus possible to obtain smooth acceleration and deceleration waveforms as the response waveform of the motor, and thus stable and shock-free control of the machine can be realized. Thus, for the conventional position loop gain Kp, it is possible to obtain higher position loop gain and realize gain increases in the servo loop control.

Other objects and features of this invention will become understood from the following description with reference to the accompanying drawings.

BRIEF DESCRIPTION OF THE DRAWINGS

FIG. 1 is a block diagram showing a construction of the position control system according to the invention;

FIGS. 12A and 12B are graphs showing a motor speed waveform when smoothing input is set to "0" time constant state;

FIGS. 14A and 14B are views for explaining a position loop characteristic of the conventional position control system;

DESCRIPTION OF THE PREFERRED EMBODIMENTS

Figure 2:
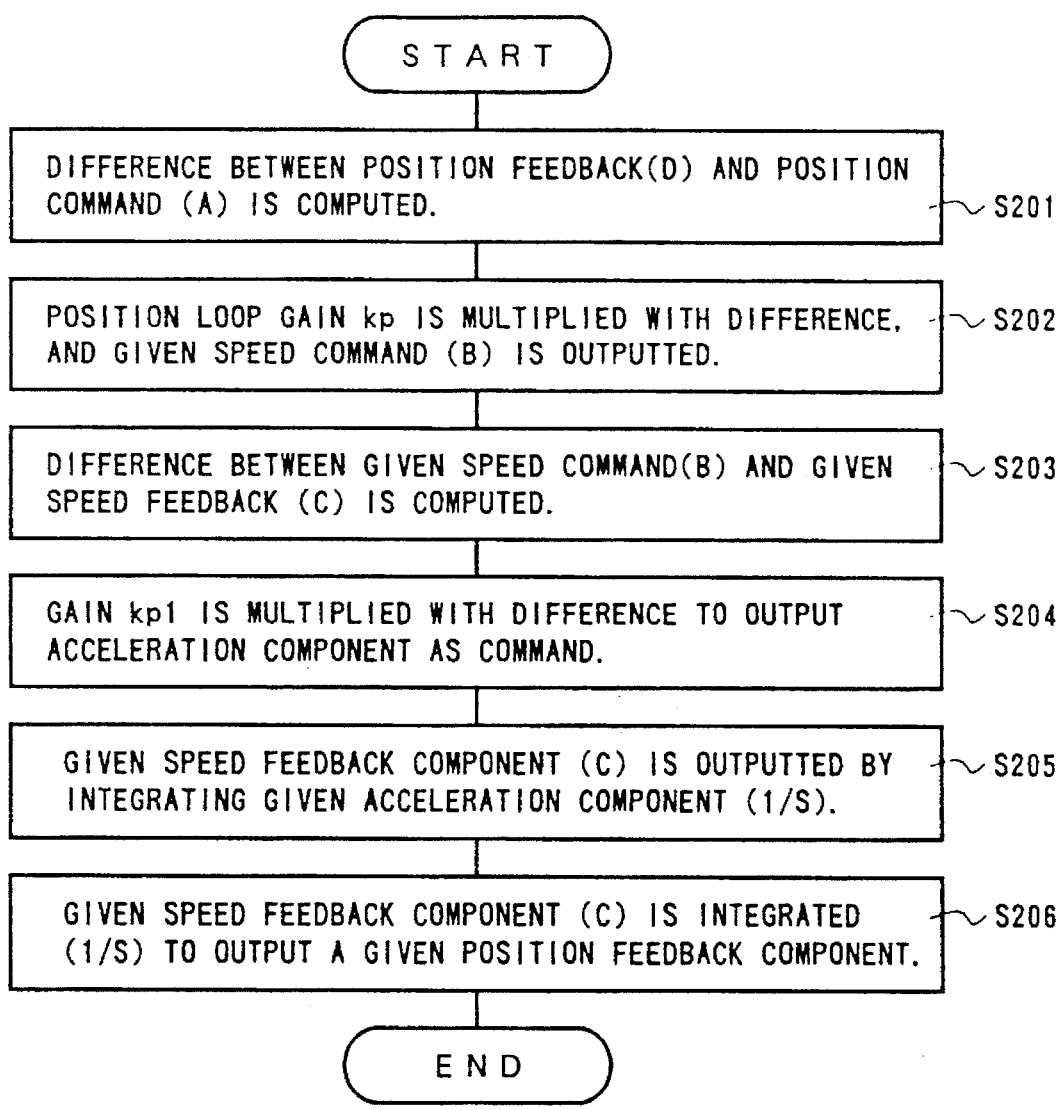
FIG. 2 is a flowchart showing an operation of the position control system shown in FIG. 1.

Now, a first embodiment of the invention will be described. FIG. 1 shows a position control system having an internal second control loop. Referring to the Figure, designated at 1 is a position loop gain operational unit (kp), and at 1a is a second control loop gain operational unit (kp1). A position feedback loop is formed at 10, providing position information from the controlled object to a summing node A. And speed loop is formed at 11, providing speed information to a summing node B. Integration 4 are caused to generate speed and position feedback values. With the provision of the internal second control loop in unit 1a, the transfer function G (S) is given as $$G(S) = \frac{kp \cdot kp1}{S^2 + kp1 S + kp \cdot kp1} \quad (4)$$

and has a second order system position loop characteristic.

Also, the loop is characterized by a dangling coefficient $\zeta$ and a speed $\omega n$, where $$G(S) \zeta = \sqrt{\frac{kp1}{4kp}} , \omega n = \sqrt{kp \cdot kp1}$$

To obtain a characteristic free from overshoot, it is necessary that $\zeta \geq 1$. To obtain a threshold $\zeta = 1$ free from overshoot, we may set $$kp1 = 4kp \quad (5)$$

By substituting equation 5 into equation 4 we have a second degree position loop characteristic given as $$G(S) = \frac{4kp^2}{S^2 + 4kpS + 4kp^2} = \frac{1}{\left(1 + \frac{1}{2kp} S\right)^2} \quad (6)$$

In this case, the radius reduction $\Delta R$ is given as $$\Delta R = \frac{1}{2} \cdot \frac{F^2}{R} \times \left(\frac{1}{4kp^2} + \frac{1}{4kp^2}\right) \quad (7)$$

$$= \frac{1}{2} \times \frac{F^2}{R} \times \frac{1}{2kp^2}$$

Thus, the first degree position loop radius reduction may be one half the value in the conventional art. Further, with respect to the feed forward effect, it is possible to obtain a 70% ($\alpha = 0.7$) feed forward effect.

Next description is made of the loop operations. FIG. 2 is a flow chart illustrating operations of the position control system shown in FIG. 1. At first, a difference between a position feedback (D) and a position command is computed (S201), a position loop gain kp is multiplied with the difference, and a given speed command (B) is outputted (S202). Then, a difference between the given speed command (B) and a given speed feedback (C) is computed (S203), and a gain kp1 is multiplied with the difference to output an acceleration component as a command (S204). Furthermore the given speed feedback component (C) is outputted by integrating the given acceleration component (1/S) (S205), and also said given speed feedback component (C) is integrated (1/S) to output a given position feedback component (S206).

Figure 3:
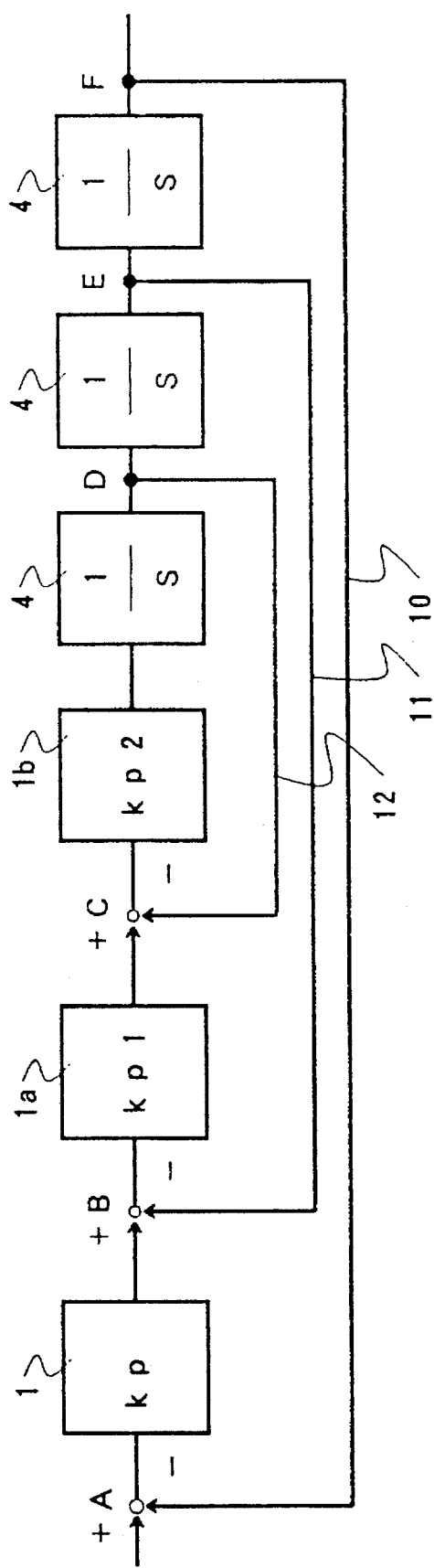
FIG. 3 is a block diagram showing a different construction of the position control system according to the invention.

Now, a second embodiment of the invention will be described. FIG. 3 shows a position control system having a second and a third internal control loop. Designated at 1 is a position loop gain operational unit (kp), at 1a a second control loop gain operational unit (kp1), at 1b a third control loop gain operational unit (kp2), at 10 is a first control loop, at 11 is a second control loop, and at 12 is a third control loop.

With the position control system shown in FIG. 3, having the second and third internal position loops 11, 12, the transfer function G (S) has a third order system position loop characteristic given as $$G(S) = \frac{kp \cdot kp1 \cdot kp2}{S^3 + kp2S^2 + kp1kp2S + kp \cdot kp1 \cdot kp2} \quad (8)$$

The third order system is generally given as $$G_2(S) = \frac{Pr \cdot \omega n^2}{(S + Pr)(S^2 + 2\zeta\omega nS + \omega n^2)} \quad (9)$$

where Pr is first degree root.

In order that this third order system is free from overshoot, it is necessary that Pr is small with respect to the real number part of the conjugate complex root of $S^2+2\zeta\omega nS+\omega n^2$. Hence, it is necessary to meet a relation $$Pr \leq \zeta\omega n \quad (10)$$

The threshold value of the freedom from overshoot is $$Pr = \zeta\omega n \quad (11)$$

By substituting equation 11 into equation 9, we have $$G_2(S) = \frac{\zeta\omega n^3}{S^3 + 3\zeta\omega nS^2 + (2\zeta^2 + 1)\omega n^2 S + \zeta\omega n^3} \quad (12)$$

From equations 9 and 12 we have $$\begin{aligned} kp \cdot kp1 \cdot kp2 &= \zeta\omega n^3 \\ kp1 \cdot kp2 &= (2\zeta^2 + 1)\omega n^2 \\ kp2 &= 3\zeta\omega n \end{aligned} \quad (13)$$

By eliminating $\zeta$ and $\omega n$ in equation 13, $$2kp2^2 - 9kp1kp2 + 27kp \cdot kp1 = 0 \quad (14)$$

A third order system free from overshoot can be obtained by giving kp1 and Kp2 satisfying equation 14.

The conditions that kp2 has the real root are $$D = 81kp1^2 - 216kpkp1 \geq 0 (kp1, kp > 0) \quad (15)$$

and $$kp1 \geq \frac{8}{3} kp \quad (16)$$

For the minimum real root of kp2, $$kp1 = \frac{8}{3} kp$$

In this case, kp2 is a multiple root, as a result, kp2=6 kp. By giving kp1 (8/3 kp) and kp2, the above equation 8 reduces to an equation $$G(S) = \frac{16kp^3}{(S + 2kp)(S^2 + 4kpS + 8kp^2)} \quad (17)$$

In this case, the radius reduction $\Delta R$ is given as $$\begin{aligned} \Delta R &= \frac{1}{2} \times \frac{F^2}{R} \times \left( \frac{1}{4kp^2} + \frac{1}{\alpha^2} + \frac{1}{\beta^2} \right) \\ &= \frac{1}{2} \times \frac{F^2}{R} \times \frac{1}{4kp^2} \end{aligned} \quad (18)$$

where $\alpha$ and $\beta$ are second degree roots.

From equation 18, it will be seen that the radius reduction may be made to be up to ¼ of the conventional first degree radius reduction. That is, it is possible to obtain an effect with double the position loop gain kp and also obtain a feed forward effect of 87% ($\alpha$=0.87).

Figure 4:
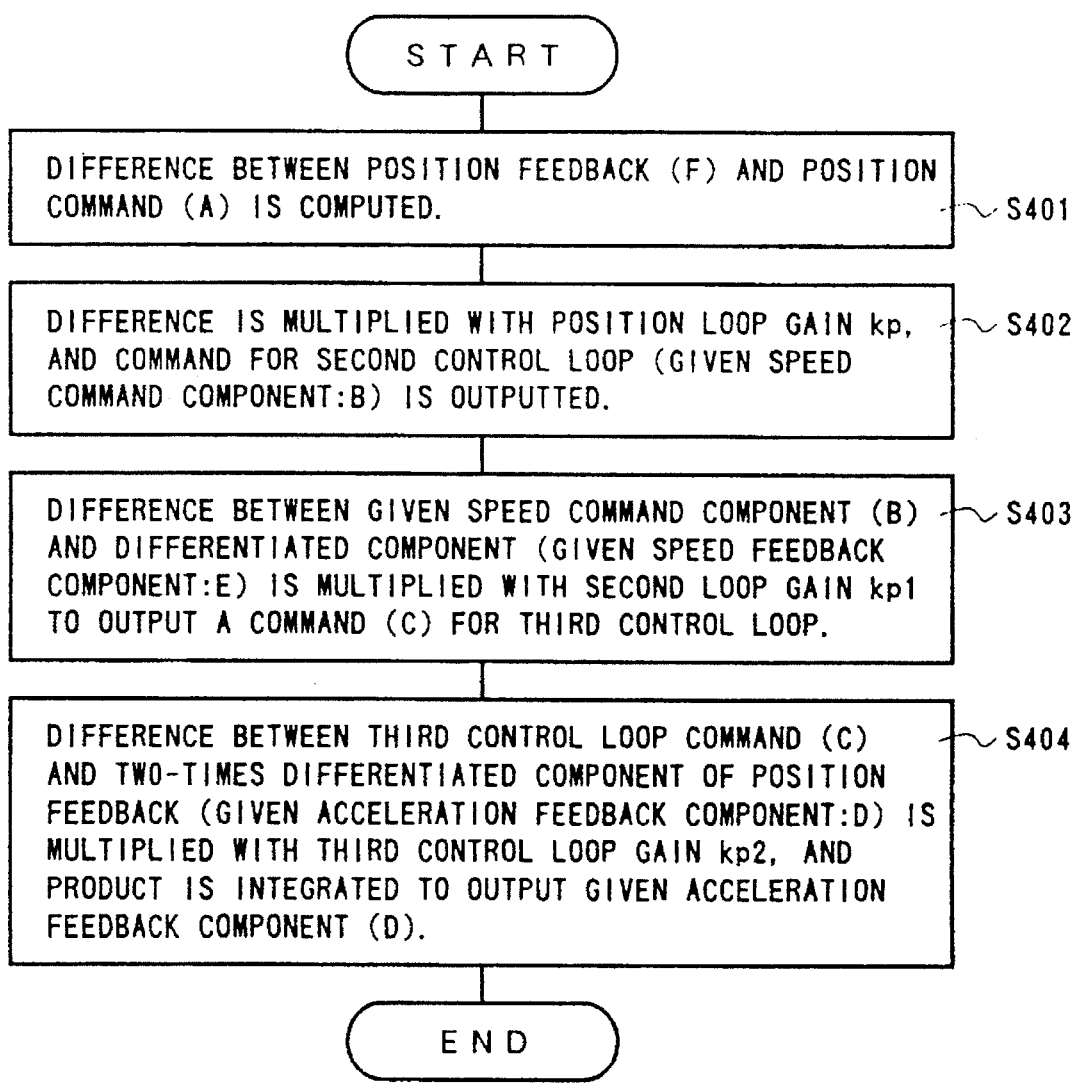
FIG. 4 is a flowchart showing an operation of the position control system shown in FIG. 3.

Next description is made for operation of the position control apparatus according to the present invention. FIG. 4 is a flow chart illustrating operations of the position control system shown in FIG. 3. At first a difference between the position feedback (F) and the position command (A) is computed (S401), then the difference is multiplied with the position loop gain kp, and a command for the second control loop (a given speed command component:B) is outputted (S402). Then, a difference between the given speed command component (B) and the differentiated component (a given speed feedback component:E) is multiplied with the second loop gain kp1 to output a command (C) for the third control loop (S403), and a difference between the third control loop command (C) and a two-times differentiated component of the position feedback (a given acceleration feedback component:D) is multiplied with the third control loop gain kp2, and the product is integrated to output a given acceleration feedback component (D) (S404).

FIGS. 5 to 10 show further embodiments of the invention. The structure shown in FIG. 5 permits an internal process loop to be obtained when forming a second degree harmonic system by forming an internal second control loop before the speed loop. The external loop is constructed by using data of the external position detector (position feedback from the machine end in the closed specifications). Thus, the inner second control loop 11 has high response compared to the first control loop 10 but permits stable operation to be obtained. Designated at 5 is the speed loop.

Figure 6:
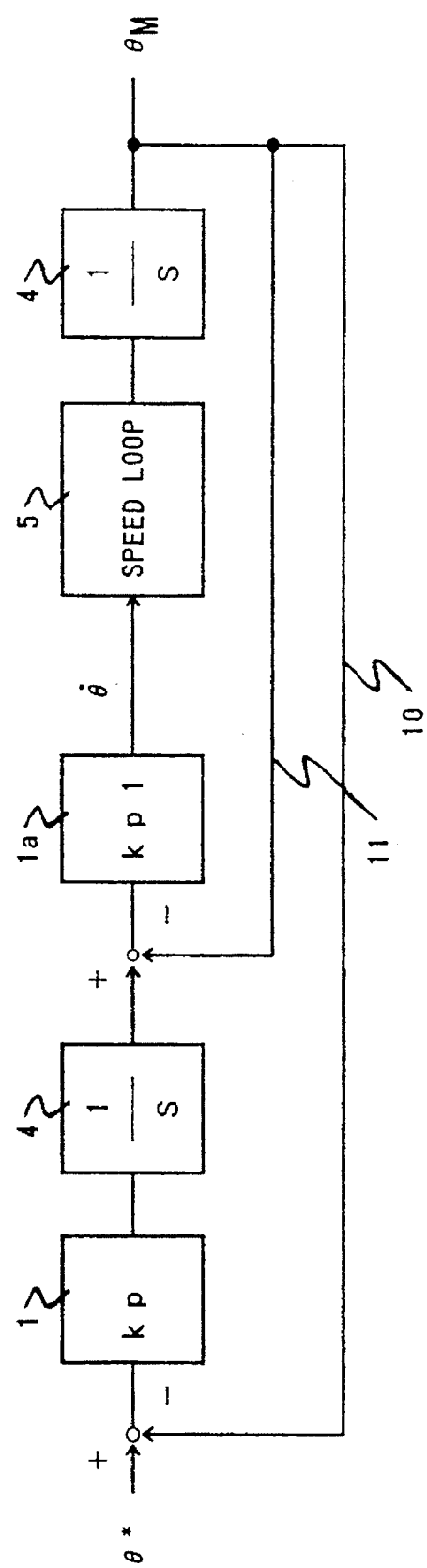
FIG. 6 is a block diagram showing a still further construction of the position control system according to the invention.

In the structure of FIG. 6, the feedback data of the internal second control loop is formed by using data of the external position detector. Thus, both the first (10) and second (11) control loops are stable. However, taking one-pulse response characteristic, with the input of a one-pulse command the motor can be driven by a command of one pulse×kp×kp1 as the speed command in the non-operation state of the machine.

Figure 5:
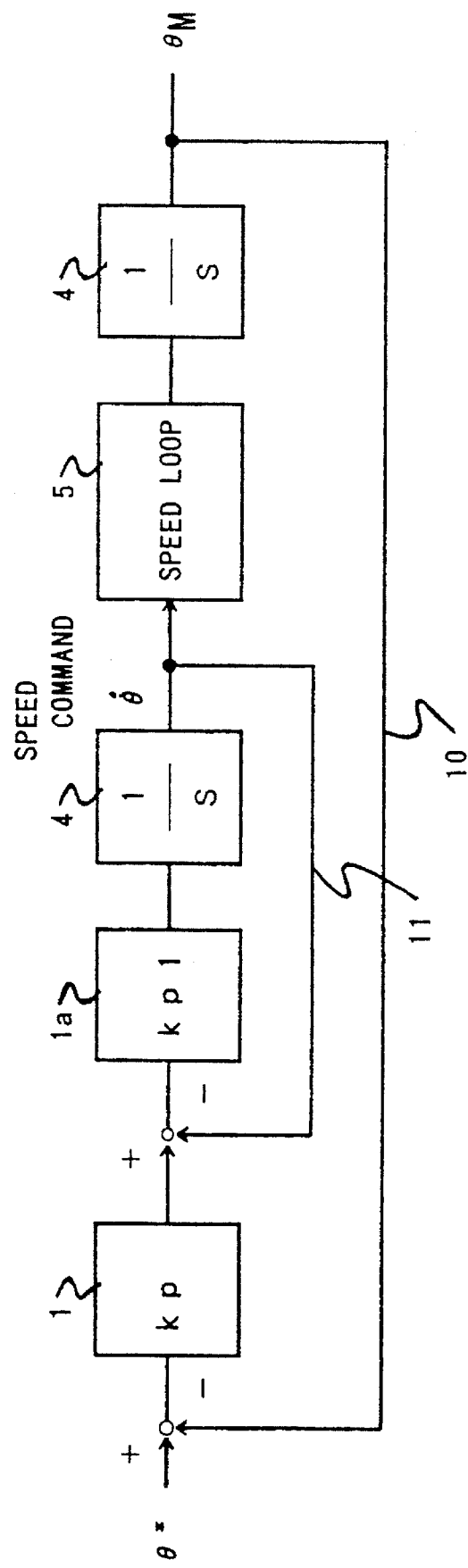
FIG. 5 is a block diagram showing a further construction of the position control system according to the invention.
Figure 7:
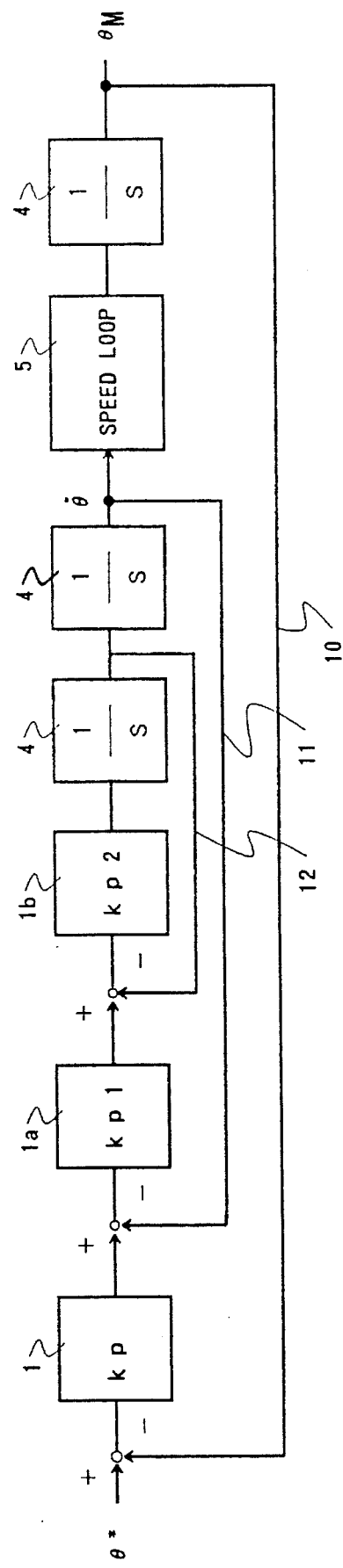
FIG. 7 is a block diagram showing a yet further construction of the position control system according to the invention.
Figure 8:
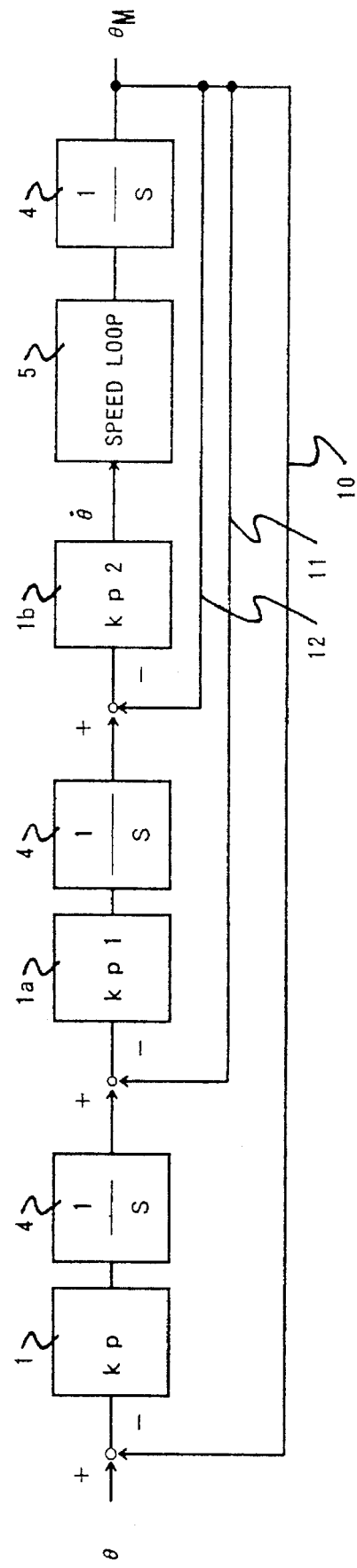
FIG. 8 is a block diagram showing a yet another construction of the position control system according to the invention.

The structure shown in FIG. 7 is a third order system version of the structure shown in FIG. 5. It has the features of high response and high attenuation of high frequencies. The structure of FIG. 8 is a third order system version of the structure shown in FIG. 6. It permits improvement of more forward gain (one pulse×kp×kp1×kp2).

Figures 9A, 9B:
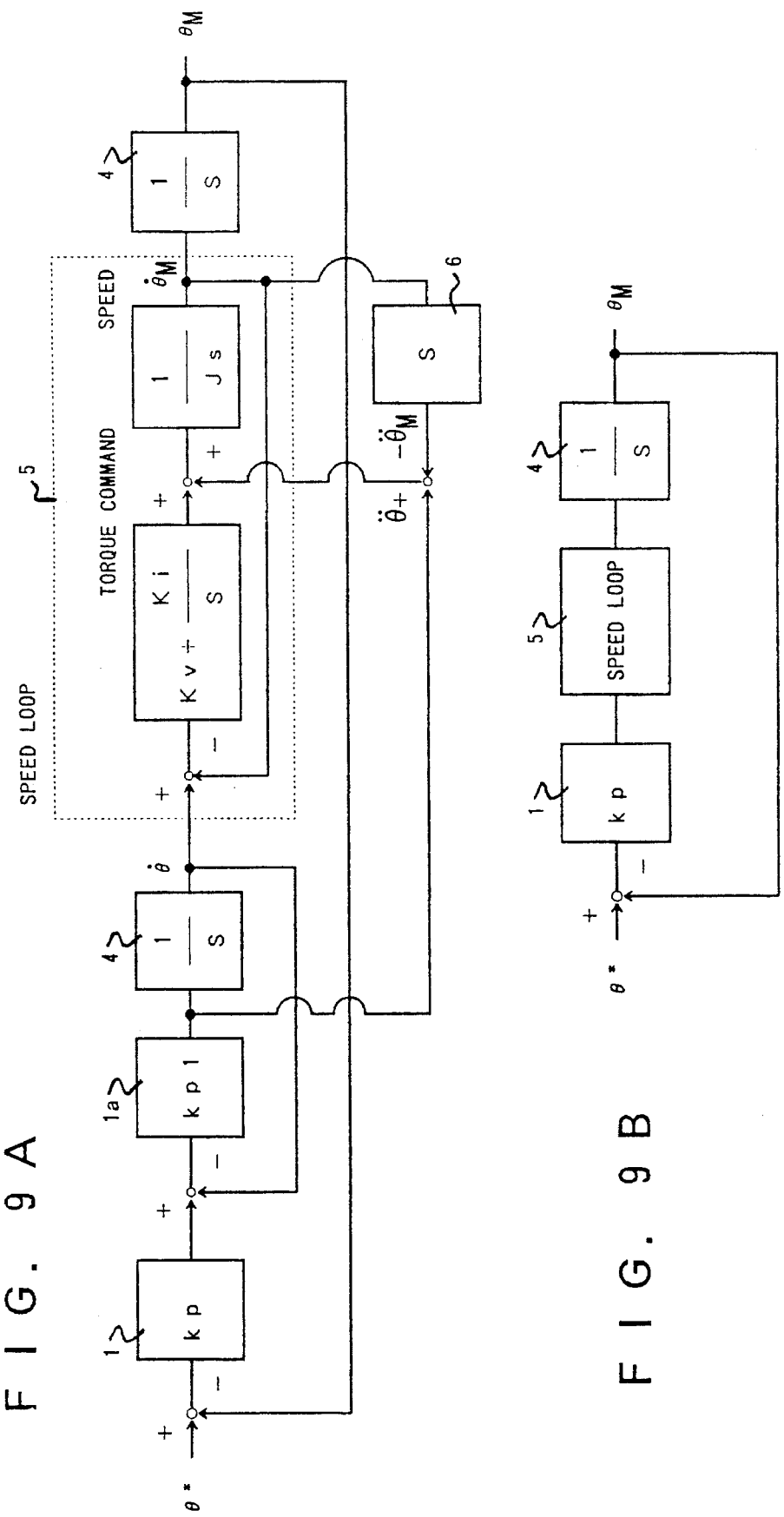
FIGS. 9A and 9B are block diagrams showing a further construction of the position control system according to the invention.

With the structure shown in FIG. 9A, the structure of the first order system is as shown in FIG. 9B. Therefore, the control loop can only provide a component obtained by multiplying the difference between the position command and the position feedback by kp as the speed command. However, a second order system structure can automatically produce not only the speed component with respect to the command but also a torque component. Thus, for a command of the torque loop, for which the response is most important, a torque command may be produced through correction in advance not only in response to a torque command produced through proportional integral control of the speed difference but also according to torque information estimated from the speed feedback, that is, by obtaining the error between the command and the torque. Thus, it is possible to obtain more robust speed loop characteristics. In FIG. 9A, 6 is a differentiator.

Figure 10:
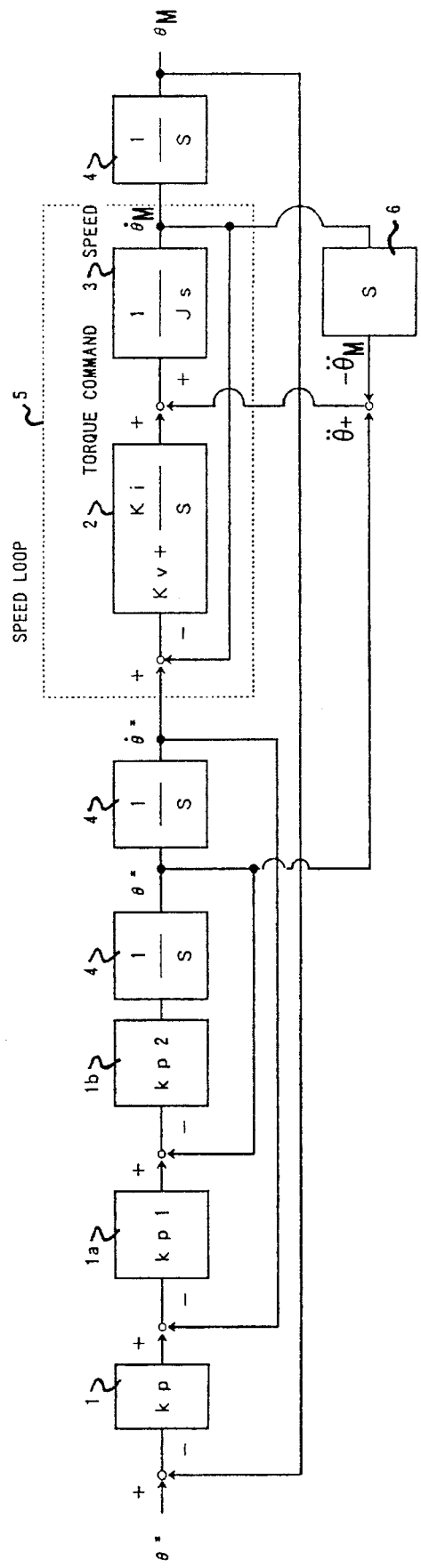
FIG. 10 is a block diagram showing a further construction of the position control system according to the invention.

The structure shown in FIG. 10 is a corrected loop a command torque component using the same third order system as that shown in FIG. 9A.

Figure 11:
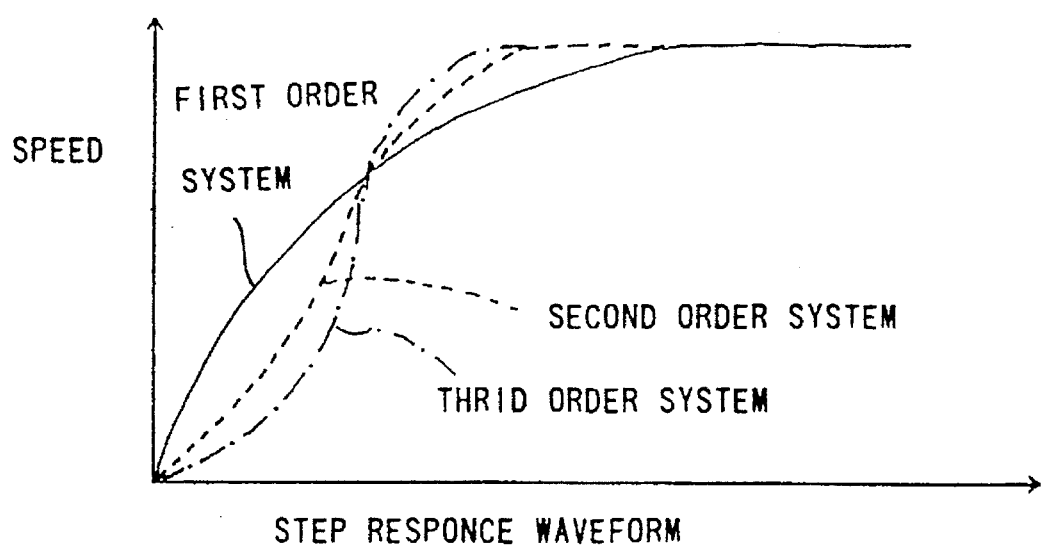
FIG. 11 is a graph showing the relation between the speed and step response waveform in first to third order system position control systems.
Figure 13:
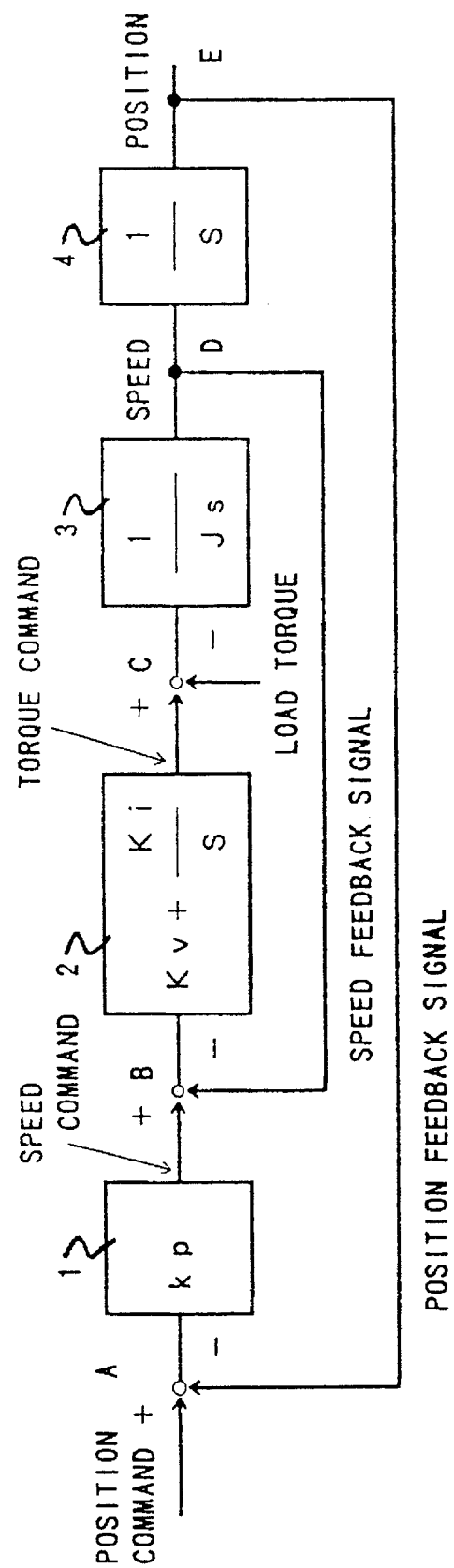
FIG. 13 is a block diagram showing a construction of the conventional position control system.
Figure 15:
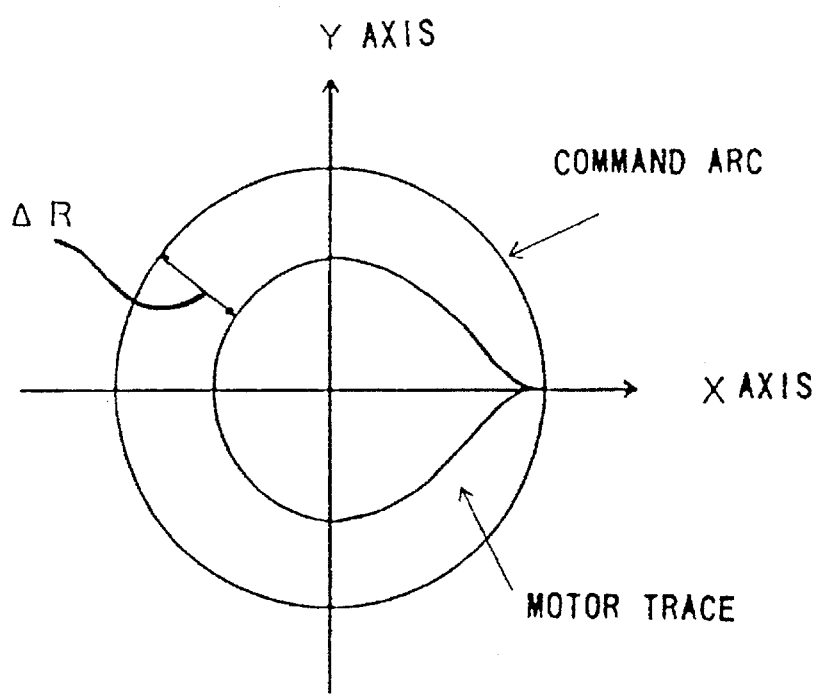
FIG. 15 is a view for explaining the motor orbit in the conventional position control system.
Figure 16:
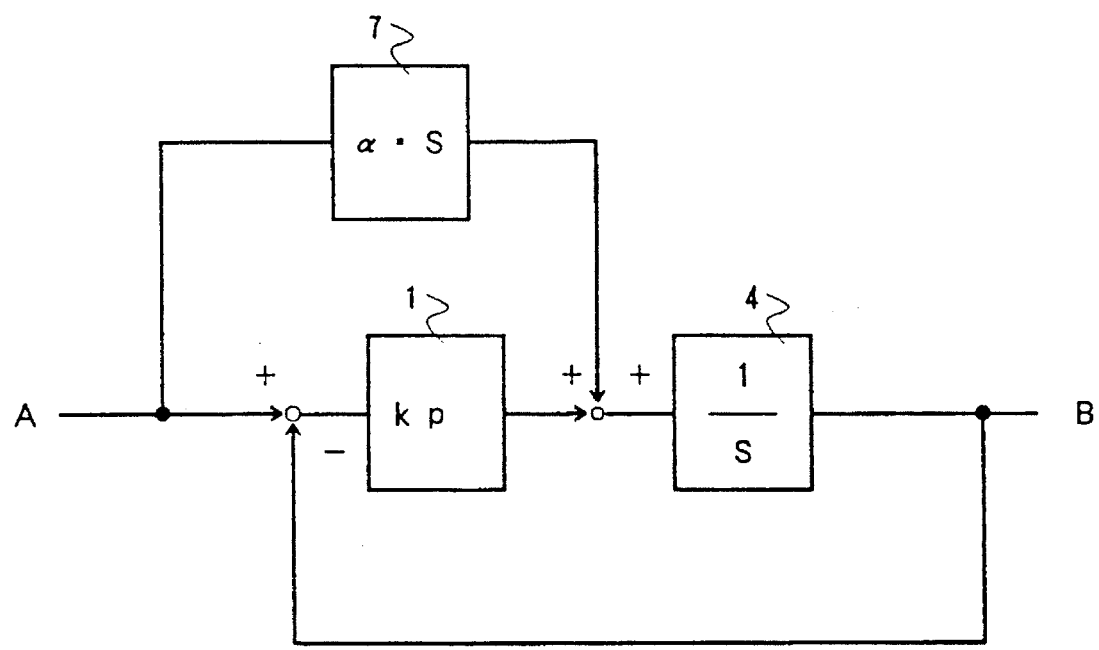
FIG. 16 is a block diagram showing conventional feed forward control.

As has been shown, with the above embodiments high response and stable control loops can be obtained by elevating the degree of the position control loop to the second, third and so forth and setting the internal control loop gain to an adequate value. Thus, in the position step response, by elevating the degree of the position control loop, the response waveform can be made smoother, as shown in FIG. 11, thus precluding vibrations of the machine.

FIGS. 12A and 12B show motor speed waveforms with the smoothing input (of accelerating and decelerating circuit) to the "0" time constant state. As shown, the first and third degree systems have different response characteristics. While the above embodiments concerned up to the third order systems, it is also possible to construct higher degree systems than the third.

Figure 17A:
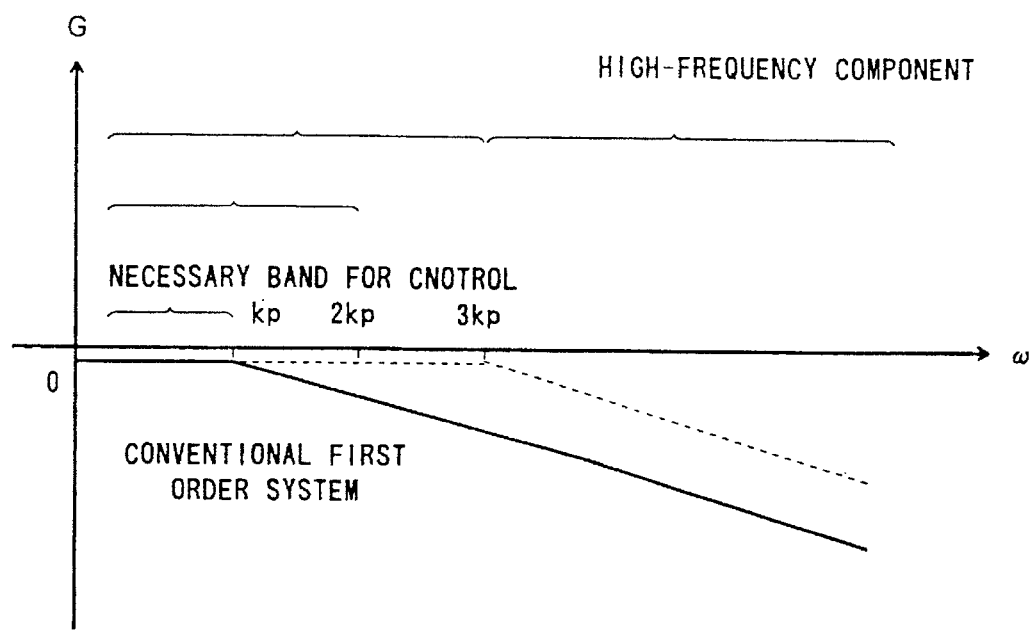
FIG. 17A is a graph comparing the conventional first order system gain increase and high harmonic system gain increase.
Figure 17B:
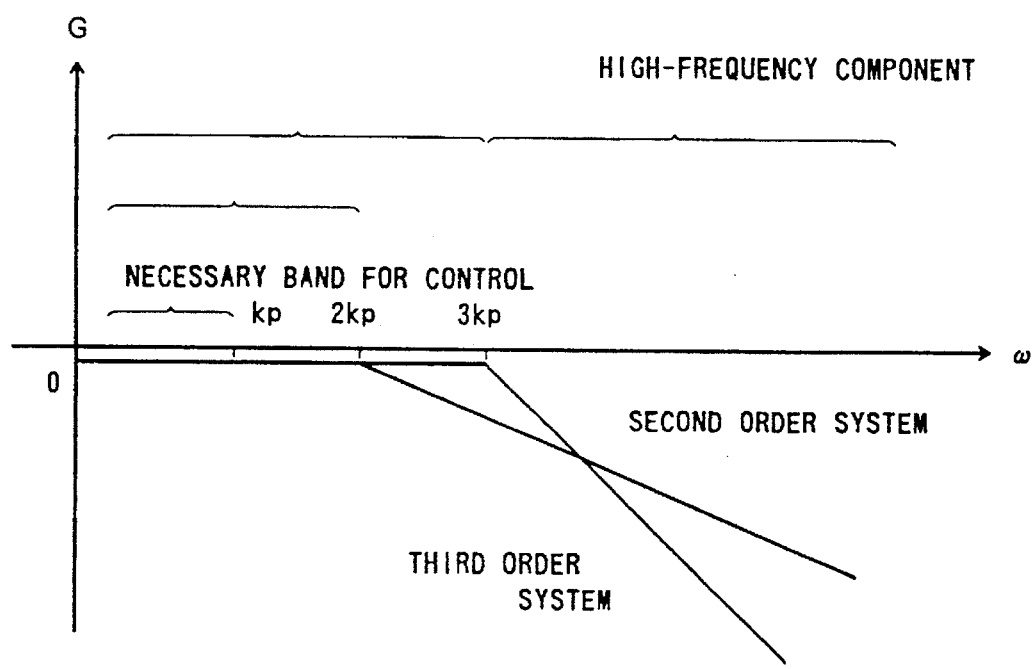
FIG. 17B is a graph comparing the first degree system gain increase and high harmonic system gain increase according to the invention.

By introducing a high order system as described above, a band (responsibility) required for control is raised as shown in FIG. 17B, while a high-frequency wave component, which is to become a disturbance component, is greatly attenuated. In other words, in a high-order system, a band is attenuated by 40 dB in a second order system and by 60 dB in a third order system, and an attenuation factor for a gain of high-frequency wave component is high even if the gain is raised. For this reason, it is possible to realize a stable system which is hardly affected by a high-frequency noise.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position control system for feeding back position information detected by position detection means for detecting the position of a movable part, said position control system having first and second control loops coupled together to form a second order system position control loop, a transfer function of said second order system position control loop being defined by the equation:

$$G(S) = \frac{1}{\left(1 + \frac{1}{2kp} S\right)^2}$$

where S=a Laplace transform operator; and
kp=a first order loop gain, wherein 4 kp is equal to a second order loop gain.

2. A position control system for feeding back position information detected by position detection means for detecting the position of a movable part, said position control system having first, second and third control loops coupled together to form a third order system position control loop, wherein a transfer function of said third order system position control loop is defined by the equation:

$$G(S) = \frac{16kp^3}{(S + 2kp)(S^2 + 4kpS + 8kp^2)}$$

where S is a Laplace transform operator, kp is a first order loop gain, the value of a second order loop gain is substantially equal to 8/3 kp, and the value of a third order loop gain is substantially equal to 6 kp.

3. A position control system as claimed in claim 2, wherein said second control loop is a speed loop.

4. A method for feeding back position information in a system for servo controlling a movable object in response to an input position command signal, said position information being provided by a detector for detecting the position of said movable object, said system being defined by a system transfer function, said method comprising the steps of:

computing a first difference between a position feedback signal and said input position command signal;

generating a speed component signal by multiplying said first difference with a position loop gain;

computing a second difference between said speed component signal and a speed feedback signal;

generating an acceleration component signal by multiplying an internal high order loop gain with said second difference;

generating said speed feedback signal by integrating said acceleration component signal; and generating said position feedback signal by integrating said speed feedback signal wherein said system transfer function G(S) is for a second order system and defined by the equation:

$$G(S) = \frac{1}{\left(1 + \frac{1}{2kp} S\right)^2}$$

where S=a Laplace transform operator; and
kp=a first order loop gain, wherein 4 kp is equal to said internal high order loop gain.

5. A system for feeding back position information from a movable object which is servo controlled in response to input commands, wherein said system is defined by a system transfer function, said system comprising:

means for detecting a position of said movable object and for generating a position signal;

a first summing junction for arithmetically processing at least a first signal and a second signal, said first signal comprising said input commands and said second signal comprising said position signal, and generating a first difference signal;

means for feeding back said position signal to said first summing junction as said second signal, to define a first control loop;

position loop gain means for processing said first difference signal and generating a speed command signal, said position loop gain means having a gain kp;

a second summing junction for arithmetically processing at least a third signal and a fourth signal, said third signal comprising said speed command signal, and outputting a second difference signal; and high order internal control loop means, comprising a gain loop of the high order internal control loop means, for receiving said second difference signal and comprising control loop gain means for processing said second difference signal to provide a signal on which said fourth signal is based;

wherein said system transfer function G(S) is for a second order system and is defined by the equation:

$$G(S) = \frac{1}{\left(1 + \frac{1}{2kp} S\right)^2}$$

where S is a Laplace transform operator, and a gain of the gain loop is substantially equal to 4 kp.

6. A system for feeding back position information from a movable object which is servo controlled in response to input commands, wherein said system is defined by a system transfer function, said system comprising:

means for detecting a position of said movable object and for generating a position signal;

a first summing junction for arithmetically processing at least a first signal and a second signal, said first signal comprising said input commands and said second signal comprising said position signal, and generating a first difference signal;

means for feeding back said position signal to said first summing junction as said second signal, to define a first control loop;

position loop gain means for processing said first difference signal and generating a speed command signal, said position loop gain means having a gain kp;

a second summing junction for arithmetically processing at least a third signal and a fourth signal, said third signal comprising said speed command signal, and outputting a second difference signal; and high order internal control loop means for receiving said second difference signal and comprising control gain loop means for processing said second difference signal to provide a signal on which said fourth signal is based, wherein said transfer function is for a third order system and said control gain loop means comprises a first gain loop having a first gain and a second gain loop having a second gain, wherein a transfer function of said third order system position control loop is defined by the equation:

$$G(S) = \frac{16kp^3}{(S + 2kp)(S^2 + 4kpS + 8kp^2)}$$

where S is a Laplace transform operator, kp is a first order loop gain, the value of said first gain is substantially equal to 8/3 kp, and the value of said second gain is substantially equal to 6 kp.

7. A method for feeding back position information in a system for servo controlling a movable object in response to input position commands, said position information being provided by a detector for detecting the position of said movable object, said system being defined by a system transfer function, said method comprising the steps of:

computing a first difference between a position feedback signal and said input position commands;

generating a speed component by multiplying said first difference with a position loop gain;

computing a second difference between said speed component and a speed feedback signal;

generating an acceleration component by multiplying an internal high order loop gain with said second difference;

generating said speed feedback signal by integrating said acceleration component; and generating said position feedback signal by integrating said speed feedback signal;

wherein said system transfer function G(S) is for a second order system and is defined by the equation:

$$G(S) = \frac{1}{\left(1 + \frac{1}{2kp} S\right)^2}$$

where S=a Laplace transform operator; and kp=a first order loop gain, wherein 4 kp is equal to said internal high order loop gain.

8. A method for feeding back position information in a system for servo controlling a movable object in response to an input position command signal, said position information being provided by a detector for detecting the position of said movable object, said system being defined by a system transfer function, said method comprising the steps of:

computing a first difference between a position feedback signal and said input position command signal;

multiplying said first difference with a position loop gain to output a command signal for a second control loop of said system;

multiplying a second difference between said command signal for a second control loop and a differentiated component of said position feedback signal with a second control loop gain to provide a command signal for a third control loop of said system; and multiplying a third difference between said third control loop command signal and a two-time differentiated component of said position feedback signal with a third control loop gain to provide a product signal, and integrating said product signal to provide an acceleration feedback component, wherein said transfer function is for a third order system and said gain loop means comprises a first gain loop having a first gain and a second gain loop having a second gain; and a transfer function of said third order system position control loop is defined by the equation:

$$G(S) = \frac{16kp^3}{(S + 2kp)(S^2 + 4kpS + 8kp^2)}$$

where S is a Laplace transform operator, kp is a first order loop gain, the value of said first gain is substantially equal to 8/3 kp, and the value of said second gain is substantially equal to 6 kp.

9. A system as claimed in claim 6, wherein said first gain loop is a speed loop.

10. A system as claimed in claim 6, wherein said first gain loop is a speed loop and said second gain loop is an acceleration loop.

11. A system as claimed in claim 6, wherein said second gain loop receives input from said position detector.

* * * * *